United States Patent [19]
Nakamura et al.

[11] Patent Number: 5,515,187
[45] Date of Patent: May 7, 1996

[54] LIQUID CRYSTAL DISPLAY WITH SIGNAL LINE, STORAGE CAPACITOR AND SOURCE ELONGATED PORTIONS FORMING STORAGE CAPACITORS BETWEEN TWO SWITCHING ELEMENTS

[75] Inventors: Hiroki Nakamura; Youichi Masuda, both of Kanagawa, Japan

[73] Assignee: Kabushiki Kaisha Toshiba, Kawasaki, Japan

[21] Appl. No.: 45,764

[22] Filed: Apr. 14, 1993

[30] Foreign Application Priority Data

Apr. 15, 1992 [JP] Japan ...................... 4-094699

[51] Int. Cl.[6] .................................. G02F 1/1343
[52] U.S. Cl. .................................. 359/59
[58] Field of Search .......................... 359/59, 58

[56] References Cited

U.S. PATENT DOCUMENTS

| | | | |
|---|---|---|---|
| 4,938,566 | 7/1990 | Takeda et al. | 359/59 |
| 5,159,476 | 10/1992 | Hayashi | 359/59 |
| 5,212,574 | 5/1993 | Katayama et al. | 359/59 |
| 5,339,181 | 8/1994 | Kim et al. | 359/59 |
| 5,394,258 | 2/1995 | Morin et al. | 359/59 |

OTHER PUBLICATIONS

Matsueda et al., "New Technologies for Compact TFT LCDs with High–Aperture Ratio", SID 1990 Digest, p. 315.

*Primary Examiner*—Anita Pellman Gross
*Attorney, Agent, or Firm*—Cushman, Darby & Cushman

[57] ABSTRACT

A liquid crystal display is described which comprises a plurality of switching elements each including an active region disposed between a drain region and a source region, a pair of pixel elements respectively connected to the drain regions of switching elements, a signal line connecting between a signal line driving circuit and the drain region of the switching element and being disposed between the pair of the pixel elements, a storage capacitor line including a portion disposed between the pair of the pixel elements, and a first dielectric layer interposed between the signal line and the storage capacitor line portion.

20 Claims, 6 Drawing Sheets

LIQUID CRYSTAL DISPLAY WITH SIGNAL LINE, STORAGE CAPACITOR AND SOURCE ELONGATED PORTIONS FORMING STORAGE CAPACITORS BETWEEN TWO SWITCHING ELEMENTS

BACKGROUND OF THE INVENTION

1. Field of the Invention

The present invention is directed to a liquid crystal display (hereinafter called "LCD") including thin film transistors (hereinafter called "TFT") as switching elements for applying a signal voltage to each pixel element in the display.

2. Description of the Related Art

An LCD comprising a plurality of pixel elements arranged in a matrix form, and a plurality of switching elements applying a signal voltage to each pixel element achieves a lightweight, low electric power consumption, high quality display image without flicker.

In these days, the LCD comprising pixel elements and driving circuits which are provided on the same substrate has been developed in order to ease the difficulty of connecting between the pixel elements and the driving circuits due to a decrease in the pixel elements' pitch.

A LCD having both fine pixel element pitch and high aperture ratio is described in "SID 90 DIGEST P.315–P.318; New Technologies for Compact TFT LCDs with High-Aperture Ratio".

Figure 5:
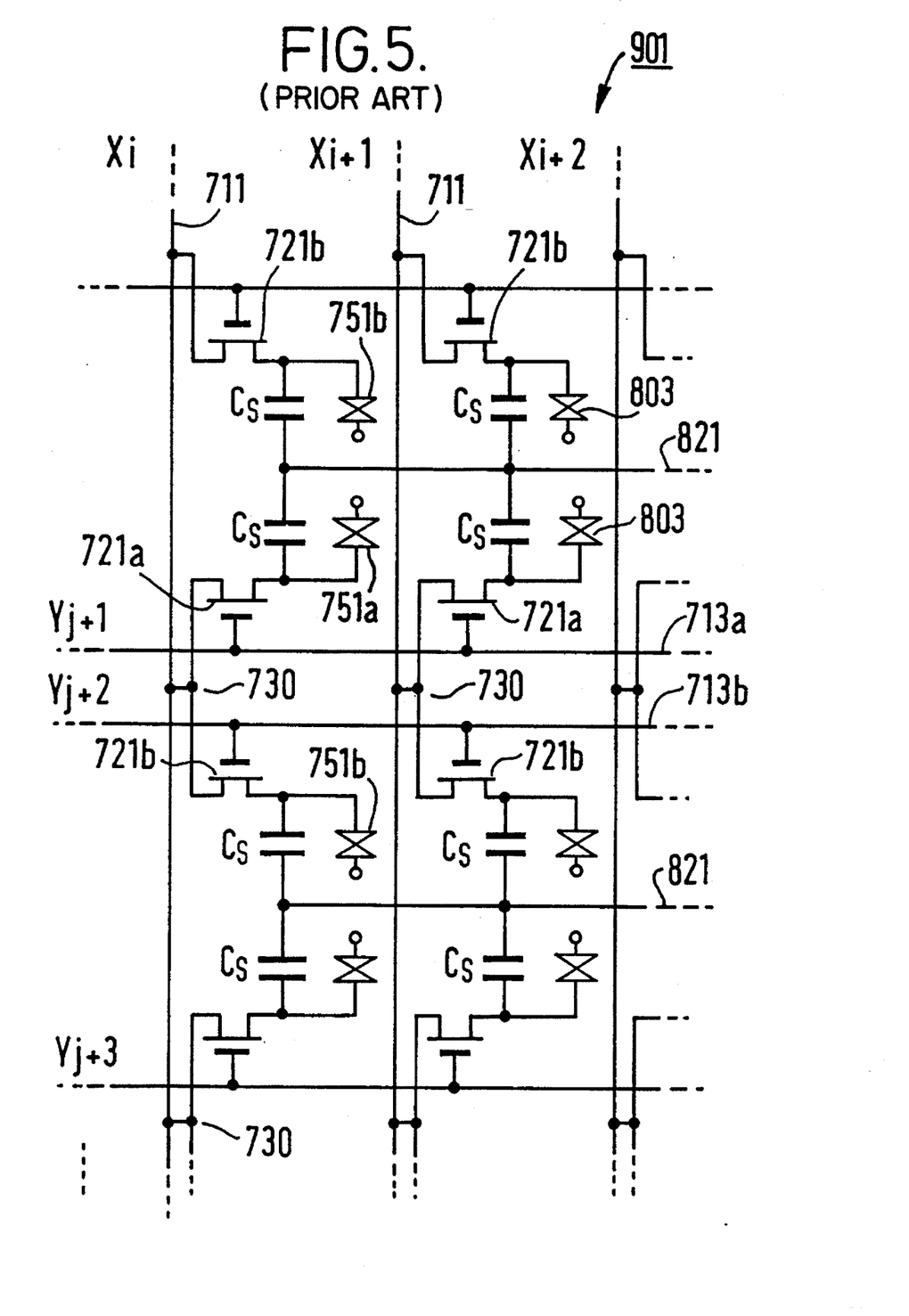
FIG. 5 is a schematic diagram of a LCD of the prior art.
Figure 6:
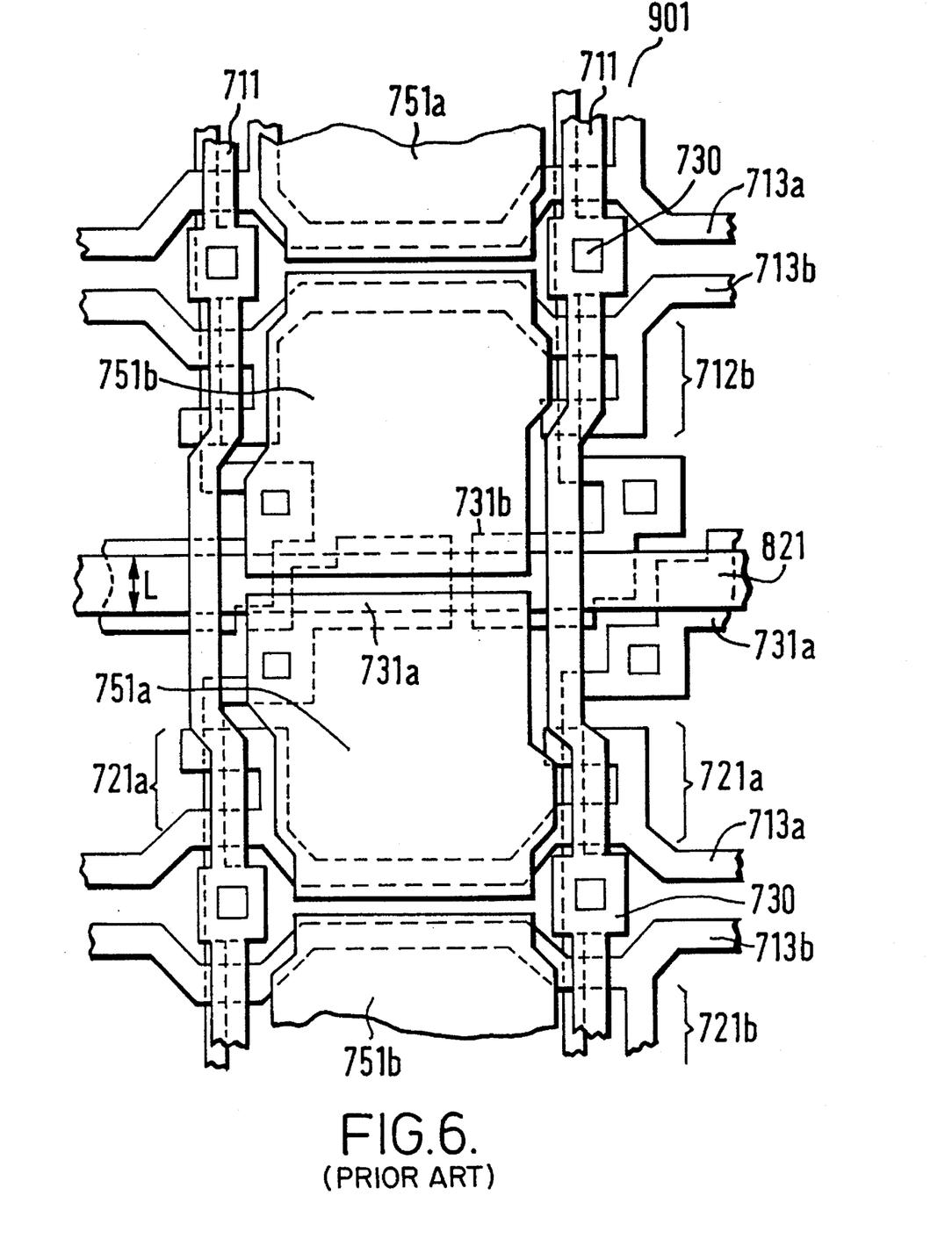
FIG. 6 is a plan view of the LCD of the prior art.

Referring to FIGS. 5 and 6, the LCD of the prior art will be described. This LCD 901 comprises a pair of electrical substrates which are opposed to each other, and a liquid crystal composition 803 sealed in the gap between the pair of electrical substrates.

As shown in FIG. 6, a matrix array substrate comprises an insulating substrate, scanning lines 713a,713b and signal lines 711 being arranged in a matrix form on the insulating substrate, TFTs 721a,721b being connected to the scanning lines 713a,713b, respectively and the signal line 711, and pixel electrodes 751a,751b being connected to the TFTs 721a,721b, respectively.

In LCD 901, a pair of the scanning lines 713a,713b are closely disposed as one unit. Storage capacitor line 821 is disposed between adjacent pixel electrodes 751a,751b, the pixel electrode 751a being arranged on one side of the pair of the scanning lines 713a,713b and the pixel electrode 751b being arranged on the opposite side of the pair of the scanning lines 713a,713b.

According to the above conventional art, as mentioned above, the number of the storage capacitor lines 821 and contact holes 730 connecting between TFTs 721a,721b and signal lines 711 decreases to half of a conventional number.

In the above conventional art, as the LCD 901 is driven in a time-wise scanning fashion, i.e., the video signal is applied to the signal lines in sequence or in each block of the signal lines, the LCD 901 has to provide an additional signal storage capacitance (Cv) outside of the display area to hold the signal voltage for at least one scanning period. This is because the LCD 901 does not provide enough signal storage capacitance (Cv) in the display area to hold the signal voltage.

According to the above conventional art, a large electrode is need for the additional signal storage capacitance (Cv), and such additional storage capacitance (Cv) would result in a larger device size compared with the display area.

Upon decreasing the pixel electrode pitch, these constraints will become highly undesirable, because the LCD needs a prescribed capacitance for signal storage capacitance (Cv) independent of the pixel electrode pitch.

Moreover, in case of sealing a pair of the electrical substrates with sealing material being disposed between the display area and the driving circuits area surrounding the display area, the electrode for additional signal storage capacitance (Cv) would be broken by a glass fiber contained in the sealing material.

SUMMARY OF THE INVENTION

An object of the present invention is to provide an LCD attaining high aperture ratio and high signal storage capacitance (Cv) in its display area.

Another object of the invention is to provide an LCD comprising a storage capacitor line having a large pixel storage capacitance (Cs) in spite of a small storage capacitor line.

Still another object of the invention is to provide an LCD which can reduce the pixel element potential level shift under the influence of the other elements potentials.

To achieve the above mentioned objects, an LCD driven by a signal driving circuit of the present invention comprises a signal line connecting the signal line driving circuit and the drain region of a switching element and being disposed between a pair of pixel elements of the LCD, a line portion of a storage capacitor line disposed between the pair of the pixel elements, and a first dielectric layer interposed between the signal line and the line portion of the storage capacitor line.

In the LCD of this invention, the signal storage capacitance (Cv) is obtained between the storage capacitor line and the signal line which are arranged between the pair of pixel elements.

Therefore, the LCD obtains a large signal storage capacitance (Cv) in the display area without decreasing the aperture ratio.

Further, the LCD does not need to provide an additional signal storage capacitance (Cv) outside of the display area, when the width of the signal line and the thickness or material of the first dielectric layer are appropriately selected.

An LCD so constructed in accordance with the invention can advantageously provide additional signal storage capacitance (Cv) and enables a decrease in the device size.

BRIEF OF THE DRAWINGS

The present invention will become more fully understood from the description given hereinbelow and the accompanying drawings which are given by the present invention, and wherein.

DESCRIPTION OF THE REFERRED EMBODIMENT

Referring FIGS. 1 to 4, an embodiment of the present invention for projection type high-definition television (HDTV) will be described.

Figure 3:
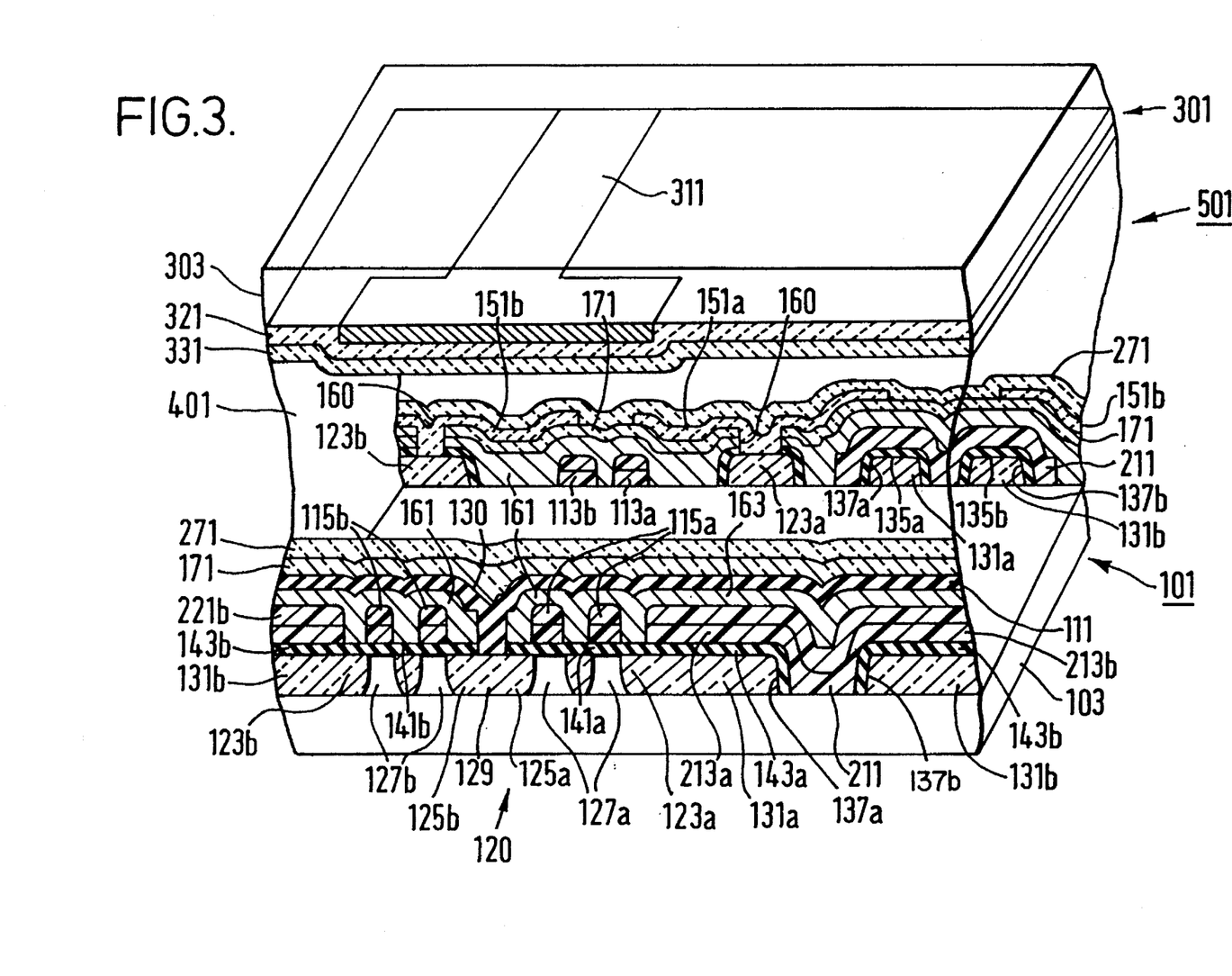
FIG. 3, as viewed from front to back, is a sectional view along the line 3'—3 and 3'—3' of FIG. 2.
Figure 4:
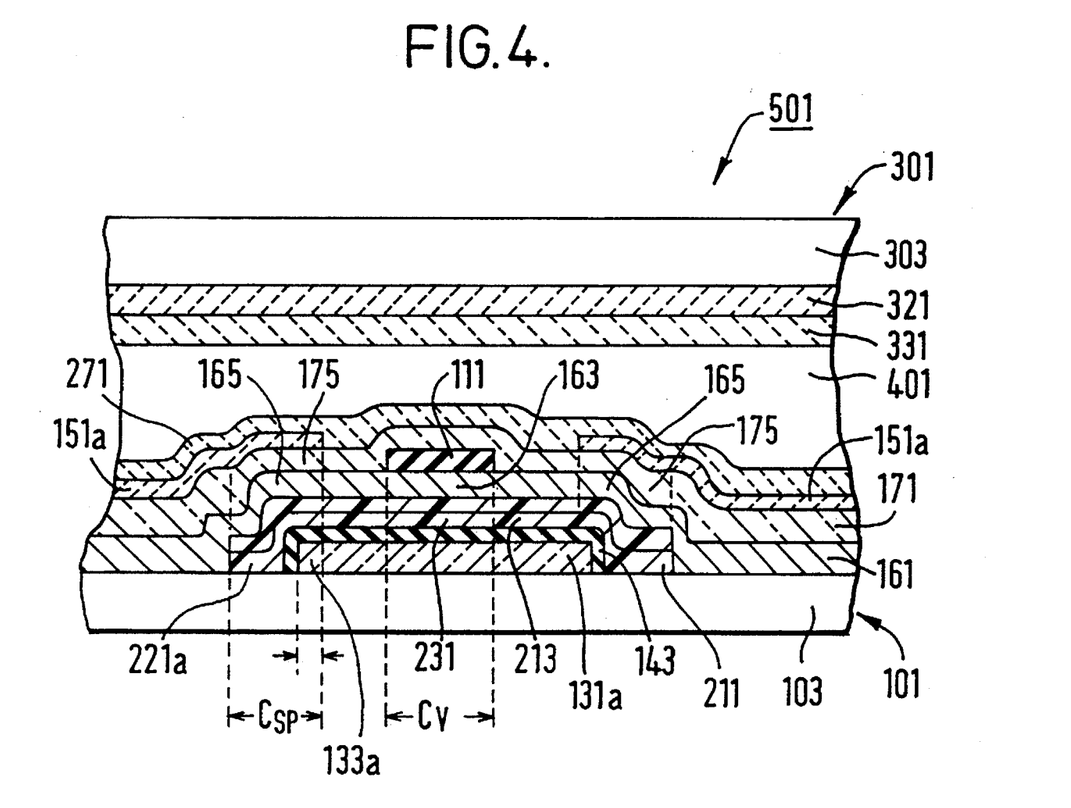
FIG. 4 is a sectional view along the line 4—4 of FIG. 2.

As shown in FIGS. 3 and 4, this LCD 501 comprises a pair of electrical substrate structures 101,301 which are opposed to each other. Each of the electrical substrates 101,301 has an alignment layer 271, 331 composed of polyimide, and a liquid crystal composition 401 is sealed in the gap between the pair of electrical substrates 101,301.

Figure 1:
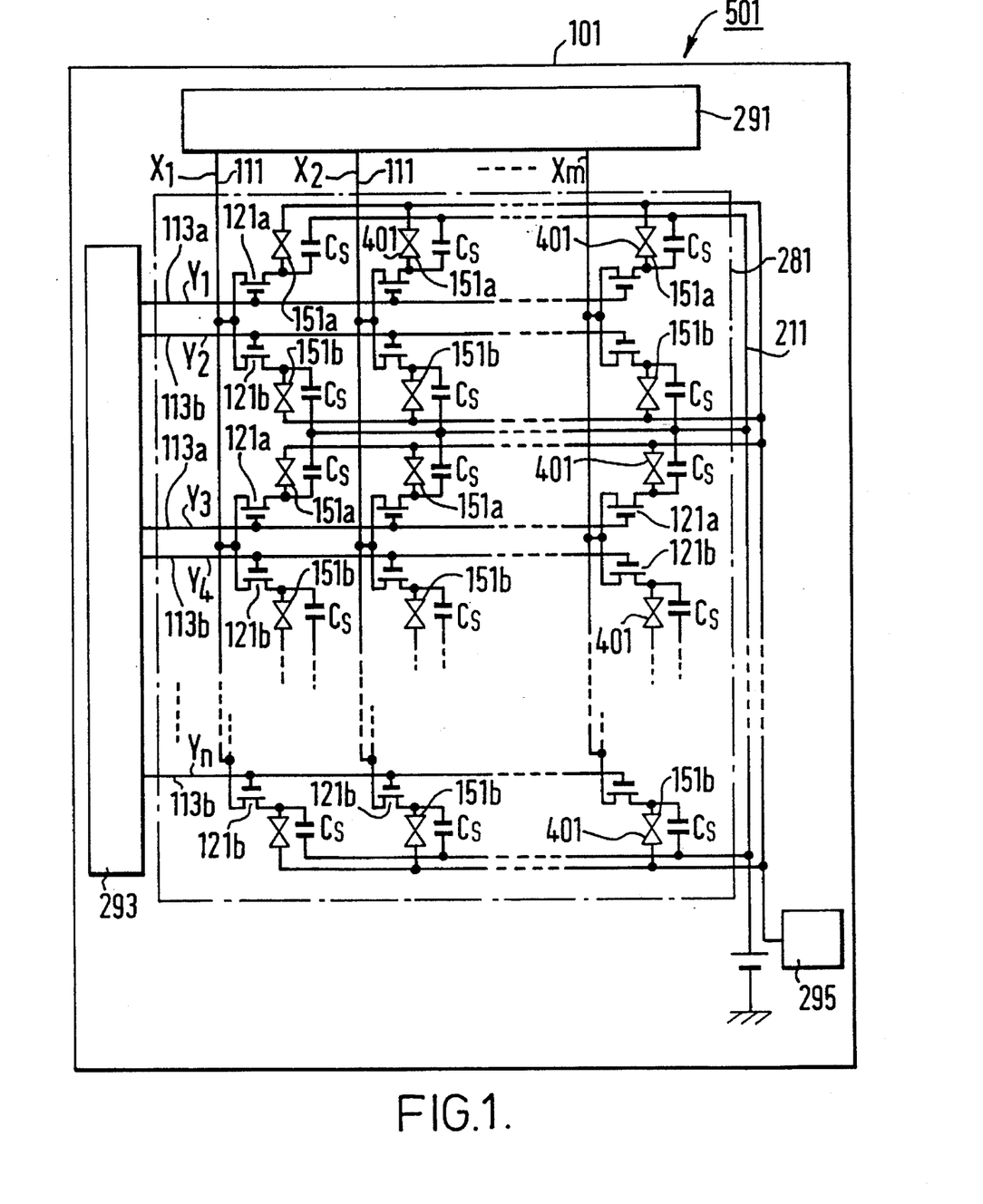
FIG. 1 is a schematic diagram of a LCD of an embodiment of the invention.

As shown in FIG. 1, the first electrical substrate 101 provides a display area 281 and a signal line driving circuit 291 which generates a signal voltage, a scanning line driving circuit 293 which generates a scanning voltage and a common electrode driving circuit 295 provided outside of the display area 281.

The signal line driving circuit 291 consists of shift registers and sample and hold circuits. The shift registers produce timing pulses for each sample and hold circuit. The sample and hold circuit consists of an analog switching TFT and signal storage capacitance (Cv) in the display area 281. The switching TFT is sampling the video signal voltage. The holding voltage the of sample and hold circuit is applied for each signal line 111 as a signal voltage. The polarity of the signal voltage is inverted relates to a standard potential every one frame period. An additional signal storage capacitance (Cv) can be provided outside of the display area 281.

In the display area 281, a plurality of signal lines Xi (i=1,2, ... ,m) 111 connecting to signal line driving circuit 291, and a plurality of scanning lines Yj (j=1,2, ... ,n) 113a,113b connecting to scanning line driving circuit 293 are arranged in a matrix form.

Figure 2:
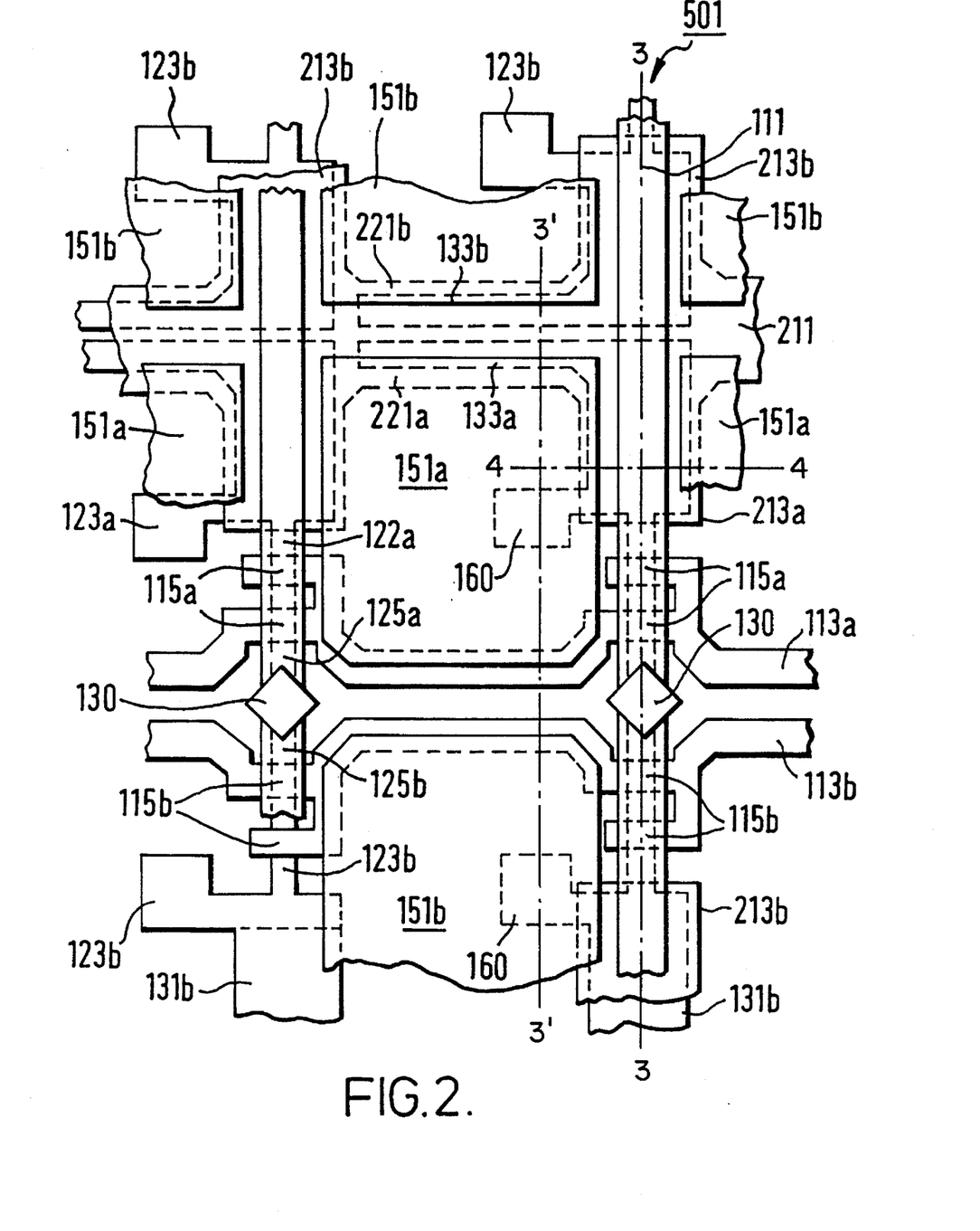
FIG. 2 is a plan view of the LCD of an embodiment of the invention.

In this LCD 501, a pair of the scanning lines 113a,113b are closely disposed as one unit. First pixel electrodes 151a composed of ITO (Indium-Tin-Oxide) are disposed on one side of each pair of scanning lines 113a,113b, and are respectively electrically connected to the source regions 123a of the TFTs 121a through the scanning lines 113a and the signal lines 111. Second pixel electrodes 151b composed of ITO are disposed on the side of each pair of the scanning lines 113a,113b, and are respective electrically connected to the source regions 123b of the TFTs 121b through the scanning lines 113b and the signal lines 111.

Storage capacitor lines 211 extend along a direction of each scanning line 113a,113b, and the storage capacitor line 211 is disposed between approximate pair of the pixel electrodes 151a,151b which are arranged between two pairs of the scanning lines 113a,113b.

A second electrical substrate 301, as shown in FIG. 3, comprises a transparent quartz substrate 303; light attenuating strips 311 composed of Cr-extending along a direction of each line 113a,113b in order to shade the TFTs 121 and between a pair of the scanning lines 113a,113b, a common electrode 321; and an alignment layer 331 coated thereon.

Electrical substrates 101,301 are opposed to each other with the gap being controlled by spacers (not shown in Figs.), and the liquid crystal composition 401 is sealed in the gap by sealing material which is provided between area 281 and the driving circuits 291,293 and 295 surrounding of the display area 281.

LCD 501 is driven in a time-wise scanning fashion.

Referring to FIGS. 2, 3, and 4, the structure of LCD 501 will now be described in detail.

Adjacent TFTs 121a,121b of this embodiment LCD 501 are described.

The first electrical substrate 101 of LCD 501 comprises a transparent quartz substrate 103, and polycrystalline-silicon (hereinafter called "p-Si") films 120 disposed on the quartz substrate 103.

Each p-Si film 120 has source regions 123a,123b, drain regions 125a,125b, active regions 127a,127b disposed between each source regions 123a,123b and each drain regions 125a,125b; and a drain connecting region 129 connecting the respective drain regions 123a,123b of the adjacent pixel electrodes 151a,151b to the signal line 111.

Gate electrodes 115a,115b are disposed over each active region 127a, 127b. These gate electrodes 115a, 115b are double layered structures each consisting of a P⁺ doped p-Si film having a thickness of approximately 1500 Å and a WSix film having a thickness of approximately 2500 Å. Gate insulating layers 141a, 141b having a thickness of approximately 1000 Å oxidized on the p-Si film 120 surface by thermal oxidation are respectively interposed between active regions 127a,127b and gate electrodes 115a, 115b.

A first intermediate insulating layer 161 (FIG. 4) and the signal line 111 are disposed thereon in that order. The drain connecting region 129 of the p-Si film 120 is electrically connected to the signal line 111 through the same contact hole 130.

A second intermediate insulating layer 171 and pixel electrodes 151a, 151b are disposed thereon in that order, and the pixel electrodes 151a,151b are respectively connected to the source regions 123a,123b of p-Si film 120 through contact holes 160.

As mentioned above, the adjacent TFTs 121a, 121b connected to the adjacent pixel electrodes 151a, 151b, one of which is disposed on one side of the pair of scanning lines 113a, 113b, and the other of which is disposed on another side of the pair of scanning lines 113a, 113b, consist of the same p-Si film 120, and are connected to one signal line 111 through the drain connecting region 129 and the same contact hole 130.

In this embodiment, the number of contact holes 130 to connect between the signal lines 111 and the TFTs 121 decreases to half of the number of the TFTs 121.

As a result, a high aperture ratio can be obtained.

As shown in FIG. 3, the signal line 111 having a large width is disposed over the active regions 127a,127b of the adjacent TFTs 121a, 121b through the first intermediate insulating layer 161 (FIG. 4) in order to shade the light beam. As a result, it is not necessary to provide an additional light attenuating layer over the active regions 127a, 127b in order to shade the reflecting light beam on the surface of the second electrical substrate 301, and photo-leakage current of TFTs 121a,121b is prevented.

The p-Si film 120 comprises adjacent source elongated regions 131a,131b extending in opposite directions relative to each other and respectively surrounding the pixel electrodes 151a,151b electrically connected to each source elongated region 131a,131b. Each source elongated region 131a, 131b include a top portion 135a,135b and a side portion 137a,137b. A dielectric layer 143a,143b for pixel storage capacitance (Cs) which is made with the same process by which the gate insulating layers 141a,141b covers both portions 135,137 of the source elongated regions 131a,131b.

The storage capacitor line 211 is disposed between the proximate pair of the first and the second pixel electrodes 151a,151b which are arranged between two pairs of the scanning lines 113a,113b, and extends along a direction of each scanning line 113a,113b.

Storage capacitor line 211 provides a plural pair of elongated portions 213a, 213b, each pair of elongated portions 213a, 213b extending in opposite directions such that portion 213a is between adjacent pixel electrodes 151a and portion 213b is between adjacent pixel electrodes 151b.

Adjacent pixel electrodes 151a are disposed on opposite sides of the signal line 111 and adjacent pixel electrodes 151b are also disposed on opposite sides of the signal line 111.

Storage capacitor line 211 is composed of the same material as the scanning line 113 and the gate electrodes 115a,115b and is electrically connected to the prescribed potential level. It can be connected between the storage capacitor line 211 and the common driving circuit 295.

Storage capacitor line 211 provides overlap portions 221a,221b overlapped on the proximate pair of pixel electrodes 151a,151b through the pixel dielectric layer 165,175 which are formed during the same steps in which the first and the second intermediate insulating layers 161,171 are formed.

Therefore, the number of storage capacitor lines 211 decreases to half of the number of scanning lines 113. As a result, a high aperture ratio in LCD 501 is obtained.

LCD 501 provides three pixel storage capacitance (Cs) in each pixel. The first pixel storage capacitance (Cst) is formed between the top portion 135a,135b of the source elongated region 131a,131b and the storage capacitor line 211. The second pixel storage capacitance (Css) is formed between the side portion 137a,137b of the source elongated region 131a,131b and the storage capacitor line 211, and the third pixel storage capacitance (Csp) is formed between the pixel electrodes 151a,151b and the overlap portions 221a, 221b of the storage capacitor line 211.

As the result, a large pixel storage capacitance (Cs) electrically connected to the pixel electrode 151a,151b can be obtained, and it is possible to reduce the pixel electrode potential level shift under the influence of other electrode potentials.

According to the above, since the source elongated region 131a, 131b formed during the same step as the source region 123a, 123b, it is desirable to decrease the resistance of the source elongated regions 131a,131b by an ion implantation process as provided for source region 123a,123b. However, it is difficult to decrease the resistance of source elongated regions 131a,131b by the same process as the source region 123a,123b, because the source elongated regions 131a,131b are covered with the storage capacitor lines 211 which blocks the implantation of the dopant.

In view of this, LCD 501 is made by the following steps. First, the p-Si layer 120 is formed on the insulating substrate and patterned in a island-like shape. Then, the source elongated regions 131a,131b for the pixel storage capacitance (Cs) are formed by an ion implantation process. The gate insulating layers 141a,141b and the dielectric layer 143a,143b for the pixel storage capacitance (Cs) are formed by thermal oxidation of the p-Si film 120 surface. Next, the gate electrodes 115a,115b and the storage capacitor lines 211 are disposed on them. Next, the active regions 127a, 127b, source regions 123a,123b, and drain regions 125a, 125b are formed by another ion implantation process using the gate electrodes 115a,115b and the storage capacitor line 211 as a mask.

Preferably, the amount of the dopant of the source elongated region 131a,131b is in the range from $1 \times 10^{17}$ to $5 \times 10^{18}$ /cm$^3$. If the amount of the dopant is too great, the thickness of the dielectric layer 143a,143b for storage capacitor line 211 becomes too thick. However if the amount of the dopant is too little, it is difficult to obtain the large storage capacitance (Cs). Therefore, the ion implantation process of the source elongated regions 131a,131b can be carried out before forming the gate insulating layers 141a, 141b and the dielectric layers 143a,143b.

It is preferred to the dielectric layer 143a,143b by the CVD process instead of the thermal oxidation process of the p-Si film. This is because it is easier to control both thickness of the dielectric layers 143a,143b and resistance of the source elongated regions 131a,131b by the CVD process.

In this embodiment, storage capacitor lines 211 having a wide width are able to decrease the response time of the storage capacitor lines 211. Increasing the storage capacitance (Cs) means increasing parasitic capacitance of the storage capacitor lines 211. Therefore, so as to increase the pixel storage capacitance (Cs), it is necessary to decrease the sheet resistance and the parasitic capacitance of the storage capacitor lines 211.

Such considerations are especially important for an HDTV LCD having a large number of pixel electrodes 151.

Therefore, in this embodiment, the double layered structure is also used for the storage capacitor lines 211 to decrease the sheet resistance. The storage capacitor lines 151 are not limited to the materials mentioned above but can also use a light attenuating layer including materials such as Mo, Mo-Ta, W and Al.

As described above, the storage capacitor lines 211 can consist of the light attenuating material. As a result, it is not necessary to dispose another light attenuating strip over the storage capacitor lines 211.

For these reasons, as shown in FIG. 3, the second electrical substrate 301 comprises the light attenuating strips 311 each disposed over the pair of the scanning lines 113a,113b and the TFTs 121a,121b in common.

According to this embodiment, it is possible to decrease the number of light attenuating strips 311 to half the number of the scanning lines 113a,113b. It is easy to adjust the position between the light attenuating strips 311 and the pixel electrodes 151a,151b, and possible to improve the manufacture productivity of the LCD 501.

In this embodiment, the source elongated regions 131a, 131b are covered with storage capacitor lines 211 through the dielectric layer 143 for storage capacitance (Cs). According to this, in spite of the source elongated regions 131a, providing overlap area 133a,133b overlapped with adjacent pixel electrodes 151a,151b, it is possible to prevent the influence of adjacent pixel electrodes' potential level.

The signal storage capacitance (Cv) of this embodiment LCD 501 is described next.

As described above, LCD 501 comprises the storage capacitor lines 211, each storage capacitor line 211 comprising the elongated portions 213a,213b extending in opposite directions between a pair of the pixel electrodes 151a and the pixel electrodes 151b, one of which is disposed on one side of the signal line 111, and the other of which is disposed the other side of the signal line 111. As shown in FIGS. 3 and 4, a dielectric layer 163 for signal storage capacitance (Cv) is the first intermediate insulating layer 161 and is interposed between the signal line 111 and the storage capacitor line 211.

In the prior LCD 901 as shown in FIG. 6, the signal storage capacitance (Cv) in the display area comprises only a signal storage capacitance (Cv) of the cross portion between the signal line 711 and the storage capacitor line 821 and between the signal line 711 and the scanning line 713. For this reason, as the signal storage capacitance (Cv) in the display area of the prior LCD 901 is too small to hold the signal voltage, it is necessary to provide the additional signal storage capacitance (Cv) outside the display area.

However, in LCD 501, a large signal storage capacitance (Cv) is provided in the display area 281. As shown in FIG. 2 and 4, the overlap portion 231 of the signal storage capacitor line 211 overlapped with the signal line 111 is sufficiently wide to obtain a large signal storage capacitance (Cv) in display area 281.

For this reason, a miniature driving circuit design is achieved.

A prescribed capacitance as the signal storage capacitance (Cv) for the LCD to hold the signal voltage is necessary, even if the pixel electrode pitch becomes smaller, in order to obtain a high quality display image. Accordingly, it is necessary to extend the electrode for additional storage capacitance (Cv) along a direction of the signal line in order to dispose a large electrode for additional signal storage capacitance (Cv) between fine pitch electrodes, and it causes enlargement of the LCD.

For this reason, the present embodiment provides desirable results, when the pixel electrode pitch decreases.

In this embodiment, as the signal storage capacitance (Cv) is provided in the display area 281, the electrodes for signal storage capacitance (Cv) are not broken by the glass fiber included in the sealing material, even if the sealing material is disposed between the signal driving circuit 291 and the display area 281.

Further, as shown in FIG. 4, the elongated portion 213 of the storage capacitor line 211 is disposed between a pair of the pixel electrodes 151a,151b. As a result, even if the signal line 111 and the pixel electrodes 151a,151b are arranged close together, the horizontal electric field between the signal line 111 and the pixel electrodes 151a,151b is restrained with the storage capacitor line 211 which acts as a shield.

For these reason, the tilt reverse domain of the liquid crystal composition 401 and the coupling capacitance between the signal line 111 and the pixel electrodes 151a, 151b occurring in the horizontal electric field are decreased, and this LCD 501 provides a high quality display image.

Also, as the horizontal electric field is decreased, it is possible to decrease the distance between the signal line 111 and the pixel electrodes 151, and obtain the high aperture ratio maintaining a high quality display image.

In this embodiment, the double gate TFTs 121 are used as the switching elements. However the single gate TFTs can also be used. In such a case, it is easy to obtain a large signal storage capacitance (Cv).

As shown in FIGS. 3 and 4, the pixel electrodes 151a, 151b are disposed on a different plane with the signal line 111 in order to prevent the occurrence of a short circuit between them. Without consideration about the short circuit, the display can be successfully practiced with the electrodes 151a,151b and the signal line 111 on the same plane.

In this embodiment, a signal storage capacitance (Cv) is obtained in the overlap portion 231 between the storage capacitor line 211 and the signal line 111. As a result, it is possible to obtain the large signal storage capacitance (Cv) in the display area 281 without reducing the aperture ratio. And it is possible to decrease the device size, because of excluding the additional signal storage capacitor (Cv) provided outside the display area 281.

In this LCD 501, each source elongated region 131a,131b is covered with the storage capacitor line 211 through the dielectric layers 143a,143b for pixel storage capacitance (Cs). As a result, it is possible to obtain a large pixel storage capacitance (Cs) without reducing the aperture ratio. This is because the pixel storage capacitance (Cs) contains the storage capacitance (Css) between the side portion 137a,13b and the storage capacitor line 211, and the pixel storage capacitance (Cst) between the top portion 135a,135b and the storage capacitor line 211. As this large pixel storage capacitance (Cs) is electrically connected to the pixel electrode 151a,151b, the pixel electrode 151a,151b potential level shift can be reduced.

Further in accordance with this embodiment of the invention, the source elongated region 131a,131b is covered with storage capacitor line 211 through the dielectric layer 143. Therefore, in spite of comprising the overlap portion between the source elongated region 131a,131b and the pixel electrode 151a,151b electrically not connected to the source elongated region 131a,131b, it is able to cancel the adjacent pixel electrode 151a,151b potential level, and provides a high quality display image.

In accordance with this embodiment of the invention, in the case in which a 40 m pixel electrode pitch is provided, it is able to obtain an aperture ratio of 40%. It is also able to obtain a signal storage capacitance (Cv) in display area 281 of 7 of the pixel storage capacitance (Cs) which is about two times larger than the conventional LCD having the same pixel pitch.

Additionally, while LCD 501 includes the light attenuating strips 311 on the second electrical substrate 301, the light attenuating strips 311 can be arranged on the TFTs 121a, 121b or under the TFTs 121a, 121b through an insulating film thereby avoiding the need to position attenuating strips on the electrical substrate 301. Further color filters can be disposed between the electrical substrates 101,301.

As the time constant with the switching TFT's equivalent series resistance and the signal storage capacitance (Cv) is the most effective factor for determining the maximum operating frequency of the signal line driving circuit 291, it is not necessary to obtain a large signal storage capacitor (Cv). Therefore, when the light shading film is disposed on the TFTs 121a, 121b through insulating films, the light shading film is formed in stripe form along a direction of the scanning lines 113a, 113b. As a result, an undesirable capacitance between light shading film and the signal lines 111 is negligible, and it is easy to control the period of applying signal voltage to the scanning lines 111.

However, when the light shading layer is disposed on the TFTs 121a, 121b, it is preferable to provide the LCD structure which comprises the signal lines 111, a first insulating layer disposed on the signal lines 111, a light attenuating layer disposed on the other insulating layer, a second insulating layer disposed on the light attenuating layer, and the pixel electrodes 151a, 151b disposed on the second insulating layer. In accordance with this structure, the coupling capacitance between the signal lines 111 and the pixel electrodes 151a, 151b is reduced. As a result, the LCD so constructed 501 is suitable for a projection type LCD, such as a view finder of a video camera.

While only certain embodiment of the present invention has been described, it will be appearance to those skill in the art that various changes and modifications may be therein without departing from the spirit and scope of the present invention as claimed.

What is claimed is:

1. A liquid crystal display having a plurality of pixel elements each electrically connected to a switching element driven by a signal line driving circuit, comprising:

a first pair of pixel elements including a first pixel element and a second pixel element;

a first switching element having a first active region disposed between a first drain region and a first source region, said first source region being electrically connected to said first pixel element;

a second switching element having a second active region disposed between a second drain region and a second source region, said second source region being electrically connected to said second pixel element;

a first signal line connecting said signal line driving circuit and said first drain region of said first switching element and being disposed between said first pixel element and said second pixel element in said first pair of said pixel elements;

a storage capacitor line including an elongated portion, said elongated portion being disposed under said first signal line and between said first pixel element and said second pixel element in said first pair of said pixel elements;

a first source elongated region extending from said first source region to a region defined between said first pixel element and said second pixel element in said first pair of pixel elements and underlying said elongated portion of said storage capacitor line, such that said elongated portion of said storage capacitor line separates said first source elongated region from said first signal line;

a first dielectric layer interposed between said first signal line and said elongated portion; and a second dielectric layer interposed between said elongated portion and said source elongated region.

2. A liquid crystal display according to claim 1, further comprising a first gate electrode disposed over said first active region, a first gate insulating layer interposed between said first gate electrode and said first active region, a second gate electrode disposed over said second active region, a second gate insulating layer interposed between said second gate electrode and said second active region, and a scanning line connecting said first and second gate electrodes.

3. A liquid crystal display according to claim 2, wherein said storage capacitor line and said first scanning line are each composed of a same material.

4. A liquid crystal display according to claim 2, further comprising:

a second pair of pixel elements adjacent to said first pair of pixel elements including a third pixel element and a fourth pixel element;

a second scanning line which, along with said first scanning line, is disposed between said first pair of pixel elements and said second pair of pixel elements;

a third switching element having a third active region disposed between a third drain region and a third source region, said third pixel element being electrically connected to said second scanning line through said third switching element; and a fourth switching element having a fourth active region disposed between a fourth drain region and a fourth source region, said fourth pixel element being electrically connected to said second scanning line through said fourth switching element.

5. A liquid crystal display according to claim 4, further comprising a drain connecting region connecting said first drain region and said third drain region to said signal line.

6. A liquid crystal display according to claim 4, further comprising a third pair of pixel elements proximate to said second pair of pixel elements; wherein said storage capacitor line is disposed between said second pair of pixel elements and third pair of said pixel elements.

7. A liquid crystal display according to claim 6, wherein said storage capacitor line is substantially composed of light attenuating material.

8. A liquid crystal display according to claim 7, further comprising a light attenuating strip formed over said first and said second scanning lines and said first, second, third, and fourth switching elements.

9. A liquid crystal display according to claim 1, wherein said first active region and said second active region are mainly composed of polycrystalline-silicon.

10. A liquid crystal display according to claim 1, further comprising an insulating substrate, said signal driving circuit and said first and second pixel elements being arranged on said insulating substrate.

11. A liquid crystal display according to claim 1, wherein said signal line is disposed over said first active region of said first switching element.

12. A liquid crystal display having a plurality of pixel elements each electrically connected to a switching element driven by a signal line driving circuit, comprising:

a first pair of pixel elements including a first pixel element and a second pixel element;

a first switching element having a first active region disposed between a first drain region and a first source region, said first source region being electrically connected to said first pixel element;

a second switching element having a second active region disposed between a second drain region and a second source region, said second source region being electrically connected to said second pixel element;

a first signal line connecting said signal line driving circuit and said first drain region of said first switching element and being disposed between said first pixel element and said second pixel element in said first pair of said pixel elements;

a storage capacitor line including an elongated portion, said elongated portion being disposed between said first pixel element and said second pixel element in said first pair of said pixel elements;

a first dielectric layer interposed between said signal line and said line portion;

a first source elongated region connected to said first source region of said first switching element;

a second dielectric layer covering at least a portion of said first source elongated region and being substantially covered with said elongated portion of said storage capacitor line.

13. A liquid crystal display according to claim 12, wherein said first source elongated region includes a top portion and a side portion, and wherein a storage capacitor is formed between said first source elongated region and said elongated portion of said storage capacitor line, said storage capacitor including a first storage capacitor portion and a second storage capacitor portion, said first storage capacitor portion being formed between said top portion of said first source elongated region and said elongated portion of said storage capacitor line, and said second storage capacitor portion being formed between said side portion of said first source elongated region and said elongated portion of said storage capacitor line.

14. A liquid crystal display according to claim 12, wherein said first source elongated region extends from said first source region to between said first pair of pixel elements.

15. A liquid crystal display having a plurality of pixel elements each electrically connected to a switching element driven by a signal line driving circuit, comprising:
- a first pair of pixel elements including a first pixel element and a second pixel element;
- a first switching element having a first active region disposed between a first drain region and a first source region, said first source region being electrically connected to said first pixel element;
- a second switching element having a second active region disposed between a second drain region and a second source region, said second source region being electrically connected to said second pixel element;
- a first signal line connecting said signal line driving circuit and said first drain region of said first switching element and being disposed between said first pixel element and said second pixel element in said first pair of said pixel elements;
- a storage capacitor line including an elongated portion, said elongated portion being disposed between said first pixel element and said second pixel element in said first pair of said pixel elements;
- a first dielectric layer interposed between said signal line and said elongated portion; and
- a second dielectric layer interposed between said elongated portion of said storage capacitor line and at least a portion of said first pixel element.

16. A liquid crystal display having a plurality of pixel elements each electrically connected to a switching element driven by a signal line driving circuit, comprising:
- a first pair of pixel elements including a first pixel element and a second pixel element;
- a first switching element having a first active region disposed between a first drain region and a first source region, said first source region being electrically connected to said first pixel element;
- a second switching element having a second active region disposed between a second drain region and a second source region, said second source region being electrically connected to said second pixel element;
- a first signal line connecting said signal line driving circuit and said first drain region of said first switching element and being disposed between said first pixel element and said second pixel element in said first pair of pixel elements;
- a storage capacitor line comprising an elongated portion extending between said first pixel element and said second pixel element in said first pair of pixel elements;
- a first source elongated region extending from said first source region between said first pixel element and said second pixel element in said first pair of pixel elements;
- a first dielectric layer interposed between said first signal line and said elongated portion of said storage capacitor line; and
- a second dielectric layer interposed between said source elongated region and said elongated portion of said storage capacitor line.

17. A liquid crystal display according to claim 16, further comprising:
- a first gate electrode disposed over said first active region,
- a first gate insulating layer interposed between said first gate electrode and said first active region,
- a second gate electrode disposed over said second active region,
- a second gate insulating layer interposed between said second gate electrode and said second active region, and
- a first scanning line connected to said first and second gate electrodes.

18. A liquid crystal display according to claim 17, further comprising:
- a second pair of pixel elements adjacent to said first pair of pixel elements and including a third pixel element and a fourth pixel element;
- a second scanning line which, along with said first scanning line, is disposed between said first pair of pixel elements and said second pair of pixel elements;
- a third switching element having a third active region disposed between a third drain region and a third source region, said third pixel element being electrically connected to said second scanning line through said third switching element; and
- a fourth switching element having a fourth active region disposed between a fourth drain region and a fourth source region, said fourth pixel element being electrically connected to said second scanning line through said fourth switching element.

19. A liquid crystal display according to claim 18, wherein said storage capacitor line includes a second elongated portion that extends from said storage capacitor line in an opposite direction of said elongated portion.

20. A liquid crystal display driven by a signal line driving circuit, comprising:
- a signal line connected to said signal line driving circuit and defining a column in a matrix;
- a first scanning line defining a first row in said matrix;
- a second scanning line defining a second row in said matrix;
- a first pixel element arranged on one side of said signal line and between said first scanning line and said second scanning line;
- a second pixel element disposed adjacent to said first pixel element and being arranged on said one side of said signal line and between said first scanning line and said second scanning line;
- a first switching element having a first source region connected to said first pixel element, a first source elongated region extending from said first source region along said signal line, a first drain region connected to said signal line and a first active region disposed between said first source region and said first drain region;
- a second switching element having a second source region connected to said second pixel element, a second source elongated region extending from said second source region along said signal line, a second drain region connected to said signal line and a second active region disposed between said second source region and said second drain region; and
- a storage capacitor line arranged between said first pixel element and said second pixel element, said storage capacitor line having a first elongated portion extending toward said first scanning line and a second elongated portion extending toward said second scanning line, wherein said first elongated portion and said second elongated portion are interposed between said signal line and said first and said second source elongated regions, respectively.

* * * * *